(12) United States Patent
Doble et al.

(10) Patent No.: US 7,644,873 B2
(45) Date of Patent: Jan. 12, 2010

(54) FUEL TRANSFER ARRANGEMENT

(75) Inventors: Cory J. Doble, Caro, MI (US); Bryan J. Gettel, Pigeon, MI (US); George E. Maroney, Kingston, MI (US); Glenn A. Moss, Cass City, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 37 days.

(21) Appl. No.: 10/779,394

(22) Filed: Feb. 13, 2004

(65) Prior Publication Data

US 2005/0178853 A1 Aug. 18, 2005

(51) Int. Cl.
*F02M 47/02* (2006.01)

(52) U.S. Cl. ............... 239/88; 239/533.1; 239/533.3

(58) Field of Classification Search ............ 239/88, 239/89, 90, 93, 533.1, 533.2, 533.3; 123/509, 123/514, 497
See application file for complete search history.

(56) References Cited

U.S. PATENT DOCUMENTS

| | | | | |
|---|---|---|---|---|
| 3,981,286 A | * | 9/1976 | Siemens | ............... 123/532 |
| 4,860,714 A | | 8/1989 | Bucci | ............... 123/514 |
| 5,070,849 A | * | 12/1991 | Rich et al. | ............... 123/509 |
| 5,148,792 A | | 9/1992 | Tuckey | ............... 123/497 |
| 5,647,328 A | * | 7/1997 | Fournier et al. | ............... 123/509 |
| 5,647,329 A | * | 7/1997 | Bucci et al. | ............... 123/509 |
| 5,667,366 A | * | 9/1997 | Reef et al. | ............... 417/198 |
| 6,343,589 B1 | | 2/2002 | Talaski et al. | ............... 123/514 |
| 6,708,904 B2 | * | 3/2004 | Itatsu | ............... 239/533.12 |

* cited by examiner

*Primary Examiner*—Davis Hwu
(74) *Attorney, Agent, or Firm*—Reising Ethington P.C.

(57) ABSTRACT

A fuel transfer system having a nozzle with an inlet in communication with a source of pressurized fuel in a portion of a fuel tank, and an outlet through which the fuel is discharged. A restrictor is arranged between the source of pressurized fuel and the nozzle. A first venturi receives fuel dispensed from the nozzle, and a second venturi receives fuel dispensed from the first venturi. The second venturi has an outlet in fluid communication with the portion of the fuel tank housing the source of pressurized fluid.

33 Claims, 2 Drawing Sheets

FUEL TRANSFER ARRANGEMENT

FIELD OF THE INVENTION

This invention relates generally to fuel systems for vehicles, and more particularly to fuel systems having fuel transfer arrangements including an auxiliary feed fuel line in fluid communication with a high pressure pump.

BACKGROUND OF THE INVENTION

Fuel systems, particularly those in automotive applications, typically incorporate a high pressure pump for pumping liquid fuel to an engine of an automobile. Some automotive fuel systems have one or more auxiliary feeds connected to the high pressure pump to supply fuel to locations other than the engine. As disclosed in U.S. Pat. No. 4,860,714 to Bucci, it is known to incorporate a jet pump in a supply side fuel line of the auxiliary feed to supply fuel to a reservoir of a fuel module. As a result, the high pressure pump needs to be sized to provide an adequate output of fuel to meet the fuel demand of the engine and the fuel demand of the auxiliary feed. As a result of diverting fuel away from the engine, inefficiencies may occur in the form of parasitic fuel flow losses, which may be of particular consequence if the fuel flow to the engine is compromised as a result of the fuel being diverted to the auxiliary feed, thereby reducing the running performance of the vehicle. This may be of particular importance during a cold weather start-up condition of the engine. Typically, a high pressure fuel pump driven by an electric motor powered by a battery of the vehicle has a reduced fuel output potential during the initial stages of a cold weather start-up, and therefore, it is generally necessary to have an oversized high pressure fuel pump to ensure that the engine receives the necessary amount of fuel to start up in cold weather. Otherwise, if the engine does not receive the necessary amount of fuel during the initial starting procedure, the engine may stall or even not start, and thus be hindered from starting and warming up.

Inefficiencies within a fuel system resulting from diverting an excess flow of fuel from the engine to an auxiliary feed sometimes results from the necessity to provide an oversized jet nozzle in the jet pump to prevent contamination from clogging or restricting flow of fuel through the auxiliary feed. Accordingly, the high pressure fuel pump may be required to have an inefficiently sized output capacity to meet the excess fuel demand of the auxiliary feed, thereby resulting in inefficiencies with the fuel system.

SUMMARY OF THE INVENTION

A fuel transfer system for pumping fuel from one portion of a fuel tank to another portion of a fuel tank or reservoir of a module, other than the engine, utilizes a controlled amount of fuel from a source of pressurized fuel to regulate the fuel transferring action of the system. Accordingly, the engine receives an amount of fuel to meet its demand from the source of pressurized fuel throughout a running cycle of the engine with minimal parasitic fuel flow losses resulting from diverting fuel flow to the fuel transfer system.

The system has a jet pump with a nozzle disposed in one portion of the fuel tank or reservoir, having an inlet in communication with the source of pressurized fuel to receive fuel therethrough, and an outlet through which the fuel is discharged. Further, the jet pump has a first venturi in fluid communication with the outlet of the nozzle having an outlet through which fuel is dispensed. The first venturi receives fuel dispensed from the nozzle, thereby causing fuel other than that flowing from the nozzle to enter the first venturi. In addition, the jet pump has a second venturi in fluid communication with the first venturi. The second venturi receives fuel dispensed from the first venturi, and in turn, causes fuel other than that being dispensed from the first venturi to enter the second venturi. The second venturi has an outlet in fluid communication with the portion of the fuel tank or reservoir, other than the engine, to which fuel is directed from the outlet of the second venturi.

Another aspect of the system for pumping fuel from one portion of the fuel tank to another portion of the fuel tank or reservoir, other than the engine, provides a nozzle with an inlet in fluid communication with a source of pressurized fuel for receiving pressurized fuel therethrough, and an outlet for dispensing the fuel. Further, a restrictor plate is arranged between the source of pressurized fuel and the nozzle. The restrictor plate regulates the fuel consumption of the system from the source of pressurized fuel, thereby limiting the degree of parasitic fuel flow losses impacting the amount of fuel readily available to an engine receiving its supply of fuel from the source of pressurized fuel.

Another aspect of the invention provides a fuel pump module having a reservoir, a high pressure fuel pump having an outlet, a jet pump with a nozzle connected to the outlet of the high pressure fuel pump outlet and a restrictor plate having an orifice is received between the outlet of the fuel pump and the nozzle to restrict the flow of fuel flowing from the high pressure fuel pump through the nozzle.

Objects, features and advantages of this invention include an apparatus that provides an optimal fuel flow rate within an auxiliary feed of a fuel system, reduces parasitic fuel flow losses from a source of pressurized fuel, improves the efficiency of a source providing pressurized fuel within the fuel system, allows use of a source providing pressurized fuel having a reduced total fuel flow output, reduces noise and power consumption within the fuel system, increases the useful life of a source providing pressurized fuel within a fuel system, improves the running efficiency of an engine in fluid communication with a source providing pressurized fuel, improves the cold weather start-up and warm-up of a vehicle engine, is of relatively simple design, is economical in manufacture and assembly, and improves the running efficiency of the engine system and/or vehicle system.

BRIEF DESCRIPTION OF THE DRAWINGS

These and other objects, features and advantages of this invention will become apparent from the following detailed description of the preferred embodiments and best mode, appended claims and accompanying drawings, in which:

DETAILED DESCRIPTION OF THE PREFERRED EMBODIMENTS

Figure 1:
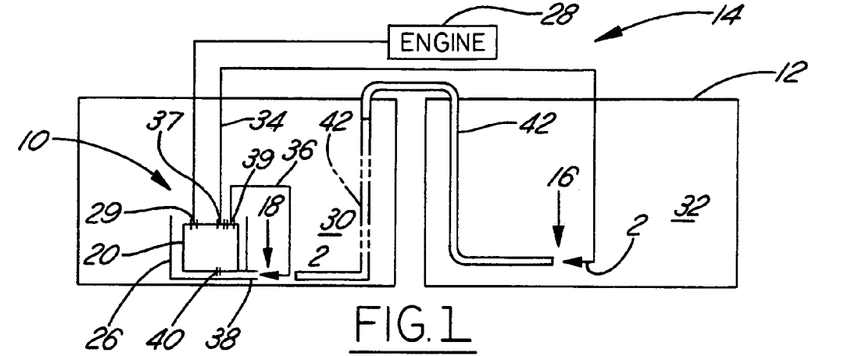
FIG. 1 is a schematic view of a fuel system incorporating a jet pump according to one embodiment of the present invention.

FIG. 1 illustrates a fuel transfer arrangement 10 for facilitating efficient operation of a vehicle engine 28. Whether the vehicle is operating in a high fuel demand mode, undergoing a cold weather start-up condition, or otherwise experiencing a challenging mode of operation, the fuel transfer arrangement 10 ensures that a high pressure fuel pump 20 within a fuel tank 12 of the vehicle provides an optimal supply of high pressure fuel to the engine 28 of the vehicle. The fuel transfer arrangement 10 redirects fuel that may otherwise remain remote from the pump 20 toward the pump 20 by using a minimal amount of fuel supply from the high pressure pump 20, thereby ensuring that the fuel pump 20 directs an optimal amount of fuel to the engine 28 to ensure efficient operation of the engine 28. Accordingly, the running efficiency of the engine 28, even during the most challenging modes of operation to the fuel pump 20, such as a cold weather start-up condition, for example, is maintained at a premium operating efficiency level.

Figure 2:
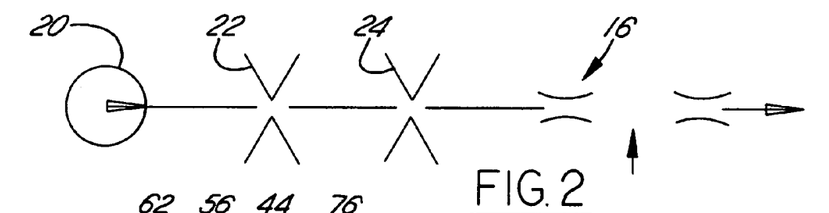
FIG. 2 is a schematic view of one arrangement of a jet pump having upstream restrictors.

The fuel transfer arrangement 10 has at least one, and as shown in FIG. 1, a pair of jet pumps 16, 18 in fluid communication with a source of pressurized fuel, for example, a high pressure fuel pump 20. As shown schematically in FIG. 2, at least one, and represented here as a pair of restrictors 22, 24 are arranged between each of the jet pumps 16, 18, with only one of the jet pumps 16 being represented, and the high pressure fuel pump 20. Accordingly, the jet pumps 16, 18 receive fuel under pressure from the high pressure fuel pump 20 at a first flow rate, and operate to provide an output of fuel at a second flow rate that is increased from the first flow rate. Preferably, the jet pumps 16, 18 are arranged to direct fuel within the fuel tank 12 generally toward a reservoir 26 carrying the high pressure fuel pump 20 through utilization of a minimal supply of fuel flow from the high pressure fuel pump 20. By using a minimal supply of fuel from the high pressure fuel pump to drive the jet pumps 16, 18, the operation of an engine 28 receiving fuel under pressure from an outlet 29 of the high pressure fuel pump 20 is enhanced, particularly when the engine 28 is operating at a level of high fuel demand. It should be recognized that the number of jet pumps and restrictors incorporated within the fuel transfer arrangement 10 may be altered, as desired. Since the jet pumps generally have similar constructions, only one jet pump 16 is described in detail hereafter, unless specifically referenced otherwise.

As shown in FIG. 1, one portion 30 of the fuel tank 12 houses the reservoir 26 therein, while another portion 32 of the fuel tank 12 is spaced from the reservoir 26. It should be recognized that the fuel tank 12 may be a single cavity saddle-type fuel tank, a pair of separate fuel tanks in fluid communication with one another, or a significantly large fuel tank having a portion of the fuel tank substantially spaced from a source of pressurized fuel within the fuel tank.

Still referring to FIG. 1, the jet pumps 16, 18 and restrictors 22, 24 (FIG. 2) are attached for operable fluid communication with the high pressure fuel pump 20, such as by at least one, and as shown a pair of supply fuel lines 34, 36, for example.

One of the supply fuel lines 36 is connected to an outlet 37 of the high pressure fuel pump 20 and to the jet pump 18 located generally in the same portion 30 of the fuel tank 12 as the reservoir 26, and desirably adjacent an inlet 38 of the reservoir 26 carrying the high pressure fuel pump 20. This jet pump 18 directs fuel generally surrounding the reservoir 26 into the inlet 38 of the reservoir 26 and preferably fuel toward an inlet 40 of the high pressure fuel pump 20 which inlet 40 is in the reservoir. The other supply fuel line 34 is connected to an outlet 39 of the high pressure fuel pump 20 and to the jet pump 16 arranged in the portion 32 of the fuel tank 12 substantially spaced from the reservoir 26. This jet pump 16 directs fuel into the tank portion 30 and preferably toward the reservoir 26 via a return fuel line 42 extending generally between the jet pump 16 and the portion 30 of the fuel tank 12 housing the reservoir 26. It should be recognized that the return fuel line 42 can be arranged to direct the fuel generally into the portion 30 housing the reservoir 26 or directly into the reservoir 26 generally adjacent the inlet 38 of the reservoir 26 to facilitate the entry of the fuel into the reservoir 26, and ultimately facilitate the entry of the fuel into the inlet 40 of the fuel pump 20.

Figure 3:
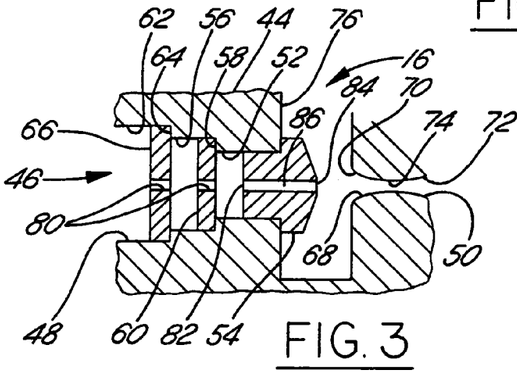
FIG. 3 is a cross-sectional view of one embodiment of a jet pump having a pair of upstream restrictors.

As shown in FIG. 3, one presently preferred construction of the jet pump 16 has a body 44 with a passage 46 extending generally therethrough. The body 44 has an inlet 48 constructed for operable attachment to a supply of fuel, such as through the supply fuel line 34, for example, preferably utilizing a standard fuel line hose connection, for example, a spring clip (not shown) compressing an outer surface of the supply fuel line 34 to compress an inner surface of the supply fuel line 34 into mating and fixed engagement with an outer surface of the body 44. The body 44 also preferably has an outlet 50 constructed for attachment with the return fuel line 42, preferably utilizing a standard fuel line hose connection as described generally above.

The passage 46 has a nozzle bore 52 for receiving at least a portion of a nozzle 54 therein. The nozzle bore 52 is preferably sized to facilitate maintaining the nozzle 54 therein, such as through an interference or line-to-line fit, for example. It should be recognized that an adhesive or a threaded union, for example, may be used to facilitate maintaining the nozzle 54 within the nozzle bore 52.

Upstream and generally adjacent the nozzle bore 52, the body 44 preferably has a first counterbore 56 with an increased diameter from the nozzle bore 52 and aligned generally concentrically with the nozzle bore 52, thus presenting a first annular shoulder 58 between the nozzle bore 52 and the first counterbore 56. Preferably, the first counterbore 56 is sized to receive and maintain a first restrictor plate 60 in abutting relation with the first shoulder 58, such as through an interference or line-to-line fit, for example.

Upstream and generally adjacent the first counterbore 56, the body 44 preferably has a second counterbore 62 with an increased diameter from and generally concentrically with the first counterbore 56, thus, presenting a second shoulder 64 between them. Preferably, the second counterbore 62 is sized to receive a second restrictor plate 66 in abutting relation with the second shoulder 64, such as through an interference or line-to-line fit, for example.

The body 44 preferably has at least one venturi 68 axially spaced downstream from the nozzle bore 52 and preferably in axial alignment with the nozzle bore 52. It should be recognized that the venturi 68 may be formed integrally and as one piece with the body 44, or it may be formed separately therefrom, and assembly therein. The venturi 68 has an inlet 70 and an outlet 72, and preferably a necked down or reduced diameter portion 74 between the inlet 70 and outlet 72.

The body 44 has at least one opening 76 generally between the nozzle bore 52 and the inlet 70 of the venturi 68. The opening 76 extends generally transversely between an outer surface (not shown) of the body 44 and the passage 46 so that fluid external to the body 44 is in fluid communication with the passage 46 generally between the nozzle bore 52 and the inlet 70 of the venturi 68. Accordingly, when fuel flows through the nozzle 54 and into the inlet 70 of the venturi 68, fuel surrounding the body 44 of the jet pump 16 is entrained or aspirated through the opening 76 to combine with the fuel pumped from the high pressure fuel pump 20 and dispensed through the nozzle 54. As a result, the volume of fuel entering the inlet 70 of the venturi 68 is increased from the volume of fuel dispensed through the nozzle 54. Accordingly, the fuel flow rate through the nozzle 54 flows at a first flow rate, and the fuel flow rate though the outlet 72 of the venturi 68 flows at a second flow rate which is greater than the first flow rate.

To facilitate regulating the amount the fuel directed from the high pressure fuel pump 20 to the nozzle 54 of the jet pump 16, desirably the first and second restrictor plates 60, 66 are seated and sealed in their respective counterbores 56, 62 upstream of the nozzle 54. The first restrictor plate 60 is received in the first restrictor bore 56 generally adjacent the nozzle 54 and seated against the first shoulder 58, while the second restrictor plate 66 is received in the second restrictor bore 62 upstream of the first restrictor plate 60 and seated against the second shoulder 64.

The first and second restrictor plates 60, 66 each have a through hole or orifice 80 sized to allow a predetermined volume of fuel therethrough at a given pressure. Desirably, the orifices 80 are sized large enough to prevent contamination from plugging or restricting the flow of fuel therethrough. Generally, the orifices 80 have a diameter of about 0.30 mm-0.80 mm, and desirably 0.40 mm-0.70 mm, and preferably 0.50 mm-0.60 mm, depending on the fuel flow requirements of the fuel system 14. As the fuel flows from the high pressure fuel pump 20 at a first pressure and first flow rate through the fuel line 34, the fuel encounters the first restrictor plate 60, wherein the orifice 80 restricts the flow rate of fuel passing therethrough. As a result, a pressure drop results across the first restrictor plate 60, thereby providing fuel at a second pressure, with the second pressure being less than the first pressure. Accordingly, the amount of fuel consumed from the high pressure fuel pump 20 through the fuel line 34 is reduced to a desired flow rate.

Further, the second restrictor plate 66 results in another reduction in fuel flow rate as the fuel flows through the orifice 80 in the second restrictor plate 66. Accordingly, the fuel consumption from the high pressure fuel pump 20 through the fuel line 34 is further reduced, thereby resulting in less fuel being directed through the auxiliary fuel line 34 and away from the engine 28. It should be recognized that though two restrictors 60, 66 are represented, that more or fewer restrictors may be used, as required, to achieve the desired fuel flow rates to the engine 28 and the auxiliary jet pump or pumps 16, 18.

Still referring to FIG. 3, the nozzle 54 has an inlet 82 and an outlet 84 with a passage 86 therebetween. The passage 86 has a diameter which can be greater than, equal to, or less than the diameter of the orifices 80 in the restrictor plates 60, 66. As fuel flows through the outlet 84 of the nozzle 54 and into the inlet 70 of the venturi 68, the fuel preferably communicates with fuel surrounding the jet pump 16 via the opening 76. As the fuel flows into the reduced portion of the venturi 68, a reduction in pressure causes fuel adjacent the inlet 70 of the venturi 68 to be entrained or aspirated to combine with the fuel exiting the nozzle and entering the venturi 68, thereby increasing the total flow rate of fuel discharged from the outlet 72 of the venturi 68. Therefore, the nozzle 54 in combination with the venturi 68 provides an increased flow rate of fuel from that flowing through the nozzle 54 from the high pressure fuel pump 20.

Figure 4:
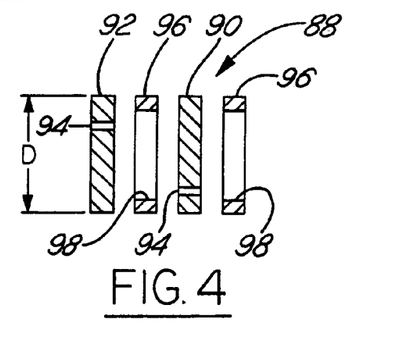
FIG. 4 is an exploded cross-sectional view of a first alternate embodiment of a pair of restrictors.
Figure 5:
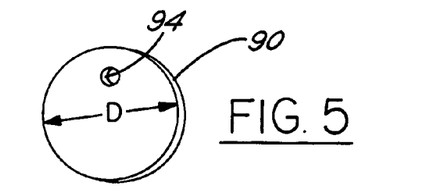
FIG. 5 is a perspective view of one of the restrictors of FIG. 4.

As shown in FIG. 4, an alternate embodiment of a restrictor assembly 88 is shown having a pair of restrictor plates 90, 92. The restrictor plates or disks 90, 92 are shown here as having similarly sized openings or orifices 94, though it should be recognized that the restrictor plates 90, 92 could have differently sized openings 94, depending on the fuel flow rate desired. The orifices 94 are generally sized as described above, and are generally spaced from one another by a pair of spacer plates or washers 96. The spacer plates 96 have enlarged openings 98 allowing fuel to flow generally freely therethrough without restriction.

The restrictor plates 90, 92 are desirably arranged so that the orifices 94 are radially offset from one another, thereby establishing a serpentine flow path for the fuel as the fuel flows between the restrictor plates 90, 92. Accordingly, as in the previous embodiment, the restrictor plates 90, 92 act together to reduced the total flow rate of fuel being used from the high pressure fuel pump 20. Desirably, the restrictor plates 90, 92 and the spacer plates 96 have substantially the same size outer diameter (D) so that they can be received and maintained in a generally cylindrical bore (not shown), such as the first counterbore 56 in the previous embodiment. Accordingly, a single shoulder may be used to maintain the restrictor plates 90, 92 and spacer plates 96 in an axially fixed position, such as the first shoulder 58 in the previous embodiment. As such, the need for multiple shoulders is not necessary to axially locate the restrictor plates 90, 92 of the restrictor assembly 88. Otherwise, the restrictor plates 90, 92 function similarly to the plates 66, 60 as described above, and are not discussed in further detail. It should be recognized that any number of restrictor plates 90, 92 and spacer plates 96 may be used to arrive at the desired reduction in flow rate, thereby achieving the desired fuel flow rate for the intended application. Further, the thicknesses of the restrictor plates 90, 92 and spacer plates 96 may be varied to alter the fuel flow dynamics, as desired.

Figure 6:
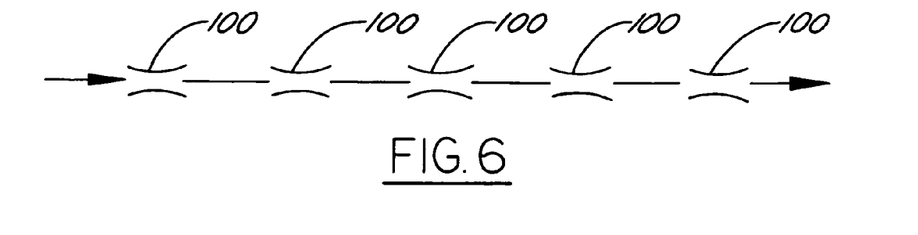
FIG. 6 is a schematic view exemplifying an alternate arrangement of a plurality of restrictors according to another presently preferred construction.

An alternate embodiment showing a plurality of in-line restrictors 100 is represented schematically in FIG. 6. It should be recognized that the number of restrictors 100 may be varied, depending on the desired reduction in flow rate.

Figures 7, 8, 9, 10:
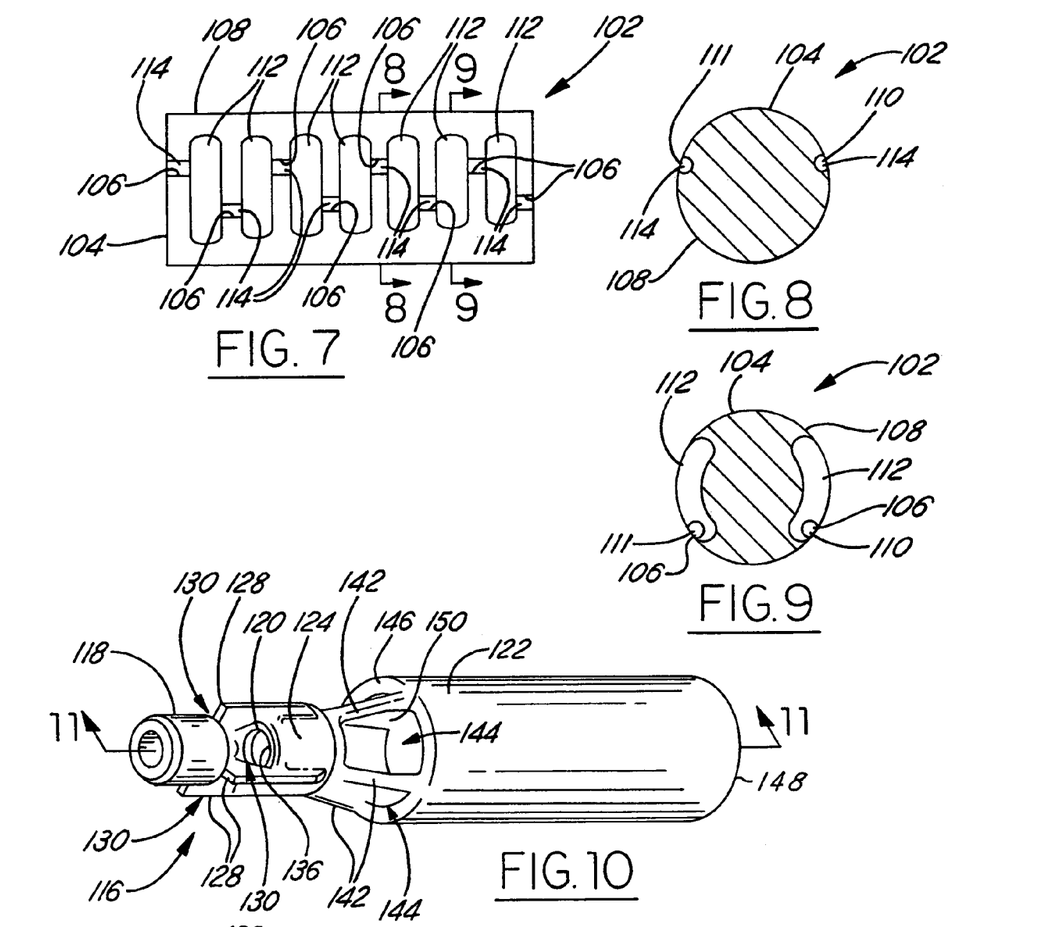
FIG. 7 is a side view of one embodiment of a plurality of restrictors arranged as shown in FIG. 6.
FIG. 8 is a cross-sectional view taken generally along line 8-8 of FIG. 7.
FIG. 9 is a cross-sectional view taken generally along line 9-9 of FIG. 7.
FIG. 10 is a perspective view of a jet pump arrangement according to another presently preferred construction.

As shown in FIGS. 7-9, an alternate embodiment of a restrictor 102 has a generally cylindrical body 104 presenting at least one, and as shown a plurality of orifices 106. The body 104 has an outer surface 108 with at least one generally serpentine channel or flow path formed therein, and preferably as shown a pair of flow paths 110, 111 (FIGS. 8 and 9) constructed on generally diametrically opposite sides of the body 104. The flow paths 110, 111 desirably mirror each other to provide equal and opposite forces resulting from the flow of fuel across the outer surface 108 of the body 104 (FIGS. 7 and 8). The flow paths 110, 111 flow over the length of the body 104, providing a plurality of pressure and flow rate reductions along the length of the body 104.

The flow paths 110, 111 are formed in part by a plurality of axially spaced recesses or scallops 112 extending generally circumferentially about at least a portion of the outer surface 108 of the body 104. Further, a plurality of channels 114 extend generally axially between the scallops 112 to define, at least in part, the plurality of orifices 106 along the length of the body 104. Desirably, the adjacent channels 114 are circumferentially offset from one another to provide a serpentine flow path for the fuel across the outer surface 108 of the body 104.

The body 104 is preferably formed as a single piece of material utilizing a molding or machining process. Accordingly, the body 104 provides a plurality of orifices in a one-piece construction to facilitate assembly, and ultimately reduce the costs associated with manufacturing. As in the previous embodiment, it should be recognized that a restrictor bore can be constructed having a generally cylindrical opening sized to receive the body 104, with a single shoulder preferably providing axial location of the body 104. Further, it should be recognized that any number of scallops 112 and channels 114 may be formed over the length of the body 104 to arrive at the desired reduction in fuel flow rate, and thus the fuel flow being used from the high pressure fuel pump 20 may be regulated, as desired.

Figure 11:
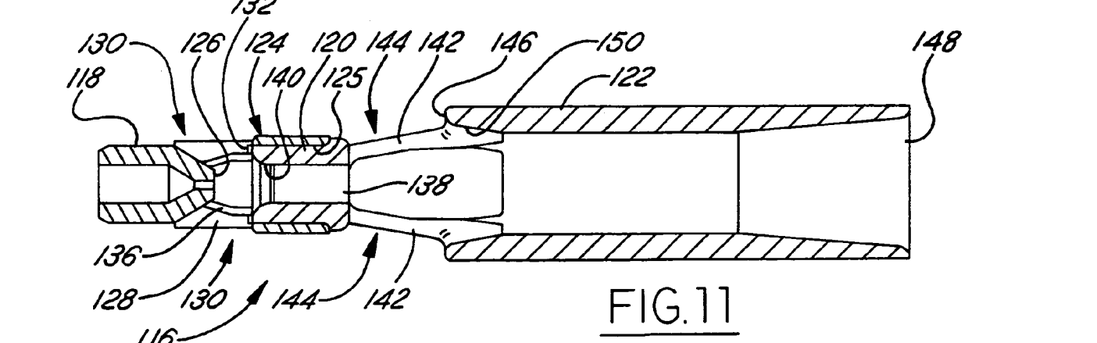
FIG. 11 is a cross-sectional view taken generally along line 11-11 of FIG. 10.

As shown in FIGS. 10 and 11, another aspect of a presently preferred construction includes a staged jet pump 116 having a nozzle 118 upstream of a first venturi 120 and second venturi 122. The nozzle 118 is shown here constructed as a separate piece of material from the first and second ventures 120, 122. Preferably, the nozzle 118 is constructed having a housing 124 with a receptacle 125 spaced axially downstream from an outlet 126 of the nozzle 118 by a plurality of axially extending ribs 128. The receptacle 125 is constructed for attachment to the first venturi 120. The ribs 128 are circumferentially spaced from one another presenting openings 130 between the ribs 128. The openings 130 allow fuel surrounding the jet pump 116 to flow freely therethrough, thereby providing communication between the fuel dispensed from the outlet 126 of the nozzle 118 and the fuel surrounding the jet pump 116.

The first venturi 120 has a free end 132 with an outer surface 134 adjacent the free end 132 sized for attachment within the receptacle 125 of the housing 124. Desirably, the outer surface 134 of the first venturi 120 and the receptacle 125 in the housing 124 have an interference or line-to-line fit, thereby resulting in a secure connection between the housing 124 and the first venturi 120. It should be recognized that a suitable adhesive or weld joint may be used to attach the housing 124 to the first venturi 120.

The first venturi 120 has an inlet 136 in axial alignment with the outlet 126 of the nozzle 118 to receive fuel dispensed from the nozzle 118. The first venturi 120 also has an outlet 138 through which fuel is discharged. A necked down portion 140 extends from generally adjacent the inlet 136 at least partially toward the outlet 138. As fuel flows from the outlet 126 of the nozzle 118 into the inlet 136 of the first venturi 120, it causes fuel in the openings 130 between the nozzle 118 and the inlet 136 to be entrained or aspirated into the inlet 136 of the first venturi 120 along with the fuel flowing out of the nozzle 118. As a result, more fuel enters the first venturi 120 than exits the nozzle 118. Accordingly, the fuel flowing out of the nozzle 118 flows at a first flow rate, while the fuel flowing out of the first venturi 120 flows at a second flow rate which is greater than the first flow rate.

The first venturi 120 is desirably aligned with and spaced from the second venturi 122 by a plurality of axially extending ribs 142. The first venturi 120, ribs 142 and second venturi 122 are preferably formed as a single piece of polymeric material, for example by an injection molding, blow molding or machining process, though it should be recognized that they may be constructed separately from one another, and subsequently joined together, or maintained in axial arrangement with one another. The ribs 142 are circumferentially spaced from one another defining a plurality of openings 144 extending therebetween. The openings 144 provide fluid communication between the fuel exiting the first venturi 120 and the fuel surrounding the jet pump 116.

The second venturi 122 has an inlet 146 in fluid communication and preferably in axial alignment with the outlet 138 of the first venturi 120 to receive fuel dispensed from the first venturi 120. The second venturi 122 has an outlet 148 preferably in fluid communication with the portion 32 of the fuel tank 12 carrying the reservoir 26. The second venturi 122 has a necked-down portion 150 extending from generally adjacent the inlet 146 and at least partially toward the outlet 148. The necked down portion 150 causes a reduction in pressure at the inlet 146 of the second venturi 122 so that the fuel surrounding the jet pump 116, particularly between the first and second venturies 120, 122 is entrained or aspirated through the openings 144 to combine with the fuel being dispensed by the first venturi 120 toward the inlet 146 of the second venturi 122. As a result, fuel flows into the second venturi 122 at a third flow rate which is greater than the second flow rate of fuel exiting the first venturi 120.

It should be recognized that the nozzle 118, first venturi 120 and second venturi 122 communicate with the fuel line 34, preferably in colinear arrangement with one another, downstream of the restrictors 60, 66, 90, 92, 100, 102, discussed in the previous embodiments. Accordingly, aside from the first and second venturis 120, 122 increasing the fuel flow rate, the restrictors 60, 66, 90, 92, 100, 102 reduce the fuel flow rate consumed from the high pressure fuel pump 20. Accordingly, an increased fuel flow rate from the venturi is obtained from that of the fuel flow rate being used from the high pressure fuel pump 20. In addition, by restricting the amount of fuel being used from the high pressure fuel pump 20, the fuel flow demands of the engine 28 may be met more readily and efficiently and with a reduced capacity high pressure fuel pump. At the same time, the fuel flow rate used from the high pressure fuel pump 20 may be reduced by entraining or aspirating more fuel from another part of the fuel tank 12 and combining it with the fuel supplied to the inlet of the high pressure fuel pump 20. Accordingly, a reduced amount of fuel may be used from the high pressure fuel pump 20 to direct fuel located in the remote portion 32 of the tank 12 back toward the high pressure fuel pump 20. As such, a high pressure fuel pump 20 having a reduced output capacity may be used to supply the fuel demands of the engine 28, while also providing enough fuel flow to drive the jet pumps 116 in communication therewith.

If desired, a staged jet pump 116 may be used in lieu of the jet pump 18 and/or 16.

It should be recognized that the embodiments discussed above are exemplary embodiments of the currently preferred constructions, and thus are intended to be illustrative and not limiting. The scope of the invention is defined by the following claims.

We claim:
1. A fuel pump module for a fuel tank, comprising:
a reservoir;
an electric motor driven high pressure fuel pump having a fuel inlet and having a high pressure fuel outlet supplying high pressure fuel to an engine;
a jet pump having a fuel inlet communicating with the fuel tank, a fuel outlet supplying fuel to the reservoir, and a jet nozzle of the jet pump having an outlet and an inlet connected through a conduit with the high pressure fuel outlet upstream of the engine for receiving high pressure fuel from the high pressure fuel pump for fuel flow through the inlet and outlet of the nozzle to entrain fuel through the inlet of the jet pump and discharge the entrained fuel through the outlet of the jet pump and into the reservoir; and at least one restrictor plate received in the conduit between and in fluid communication with the high pressure fuel pump and the inlet of the jet nozzle, the restrictor plate having an orifice upstream of the inlet of the jet nozzle and restricting the flow of high pressure fuel flowing from the high pressure fuel pump through the inlet of the jet nozzle.

2. The fuel pump module of claim 1 wherein the reservoir has an inlet for fuel from a fuel tank and the outlet of the nozzle is generally adjacent the inlet of the jet pump.

3. The fuel pump module of claim 1 wherein the reservoir has an inlet and the jet pump has a first venturi axially spaced from the nozzle generally between the nozzle and the inlet of the reservoir, the first venturi having an inlet in fluid communication with the outlet of the nozzle to receive fuel discharged from the outlet of the nozzle, and having an outlet through which fuel is discharged generally toward the inlet of the reservoir.

4. The fuel pump module of claim 1 which also comprises a pair of restrictor plates axially spaced from one another and received between the outlet of the high pressure fuel pump and the inlet of the nozzle; and each of the restrictor plates having an orifice restricting the flow of fuel flowing to the nozzle.

5. The fuel pump module of claim 1 which also comprises a return fuel line extending generally between the outlet of the nozzle and the reservoir.

6. The fuel pump module of claim 5 wherein the reservoir has an inlet and the return fuel line extends generally adjacent the inlet of the reservoir.

7. A fuel pump module, comprising:
a reservoir having an inlet;
a high pressure fuel pump having an inlet communicating with the reservoir and having an outlet of pressurized fuel;
a nozzle having an outlet and an inlet in fluid communication with the outlet of the high pressure fuel pump for fuel flow therebetween;
at least one restrictor plate received between the outlet of the fuel pump and the inlet of the nozzle, the restrictor plate having an orifice restricting the flow of fuel flowing to the nozzle;
a first venturi axially spaced from the nozzle generally between the nozzle and the inlet of the reservoir, the first venturi having an inlet in fluid communication with the outlet of the nozzle to receive fuel discharged from the outlet of the nozzle, and having an outlet through which fuel is discharged; and
a second venturi having an inlet in fluid communication with the outlet of the first venturi to receive fuel discharged from the first venturi, and having an outlet through which fuel is discharged generally toward the inlet of the reservoir.

8. The fuel pump module of claim 7 wherein the first venturi and the second venturi are constructed as a single piece of material.

9. The fuel pump module of claim 7 wherein a pair of restrictor plates axially spaced from one another is arranged upstream of said nozzle.

10. The fuel pump module of claim 7 comprising a fuel line in fluid communication with the second venturi and communicating fuel exiting the second venturi generally toward the reservoir.

11. A fuel pump module, comprising:
a reservoir;
a high pressure fuel pump having an inlet communicating with the reservoir and having an outlet of pressurized fuel;
a nozzle having an outlet and an inlet in fluid communication with the outlet of the high pressure fuel pump for fuel flow therebetween;
at least one restrictor plate received between the outlet of the fuel pump and the inlet of the nozzle, the restrictor plate having an orifice upstream of the inlet of the nozzle and restricting the flow of fuel flowing to the nozzle;
a first venturi operably connected to the nozzle downstream from the nozzle and the first venturi providing entrainment of fuel adjacent the first venturi into the first stream of fuel to provide a second stream of fuel having a second volume and discharged from the first venturi, the second volume being greater than the first volume; and
a second venturi axially spaced downstream from the first venturi providing entrainment of fuel adjacent the second venturi into the second stream of fuel exiting the first venturi to provide a third stream of fuel having a third volume and discharged from the second venturi, the third volume being greater than the second volume and the third stream being delivered to the reservoir.

12. The fuel pump module of claim 11 wherein the first venturi and the second venturi are operably connected to one another.

13. The fuel pump module of claim 12 wherein the first venturi and the second venturi are constructed as a single piece of material.

14. A fuel transfer arrangement for transferring fuel from one portion of a fuel tank to another portion of a fuel tank spaced from said one portion, comprising:
a source of high pressure fuel having a fuel inlet in one portion of the fuel tank and an outlet of high pressure fuel supplied to an engine;
a jet pump with an outlet, an inlet disposed in another portion of the fuel tank spaced from the one portion of the fuel tank and the fuel inlet of the source, and a nozzle having an inlet connected with the outlet of the source of high pressure fuel upstream of the engine to receive high pressure fuel from the source, and an outlet through which fuel is discharged;
at least one restrictor plate having an orifice connected through a conduit with the outlet of high pressure fuel of the source upstream of the engine, disposed between the source of high pressure fuel upstream of the engine and the inlet of the nozzle and axially spaced upstream from the inlet of the nozzle to restrict the flow of high pressure fuel to the nozzle; and
a first venturi having an inlet in communication with the another portion of the fuel tank and with the outlet of the jet pump nozzle to receive fuel discharged from the nozzle, and an outlet through which fuel is discharged from the first venturi, the flow of fuel from the nozzle to the first venturi causing fuel to move from the another portion of the fuel tank into the inlet of the first venturi.

15. The fuel transfer arrangement of claim 14 wherein the fuel discharged from the outlet of the nozzle flows at a first flow rate and the fuel discharged from the outlet of the first venturi flows at a second flow rate, the second flow rate being greater than the first flow rate.

16. The fuel transfer arrangement of claim 14 wherein the inlets and outlets of the nozzle and first venturi are co-axially aligned.

17. The fuel transfer arrangement of claim 14 wherein the source of pressurized fuel is a high pressure fuel pump having an outlet through which fuel is discharged under pressure and the inlet of the nozzle receives a portion of the fuel discharged from the high pressure fuel pump.

18. The fuel transfer arrangement of claim 14 wherein the pressurized fuel between said source and the restrictor plate has one pressure and the pressurized fuel between the restrictor plate and the nozzle has another pressure, said one pressure being greater than said another pressure.

19. The fuel transfer arrangement of claim 14 wherein a pair of restrictor plates restricts the flow of pressurized fuel between said source and the nozzle.

20. The fuel transfer arrangement of claim 19 wherein the pair of restrictor plates are axially spaced from one another and from the nozzle.

21. The fuel transfer arrangement of claim 19 wherein the nozzle has a passage with a diameter, the passage defining the inlet and the outlet of the nozzle, and the orifices have diameters, the diameter of the passage in the nozzle being equal to or less than the diameters of the orifices.

22. The fuel transfer arrangement of claim 14 wherein the nozzle has a passage with a diameter, the passage defining the inlet and the outlet of the nozzle, and the orifice has a diameter, the diameter of the passage in the nozzle being greater than, equal to or less than the diameter of the orifice.

23. A fuel transfer arrangement for transferring fuel from one portion of a fuel tank to another portion of a fuel tank spaced from said one portion, comprising:
   a source having an outlet of pressurized fuel;
   a jet pump with a nozzle disposed in one portion of the fuel tank, having an inlet in communication with the outlet of the source of pressurized fuel to receive pressurized fuel, and an outlet through which fuel is discharged;
   at least one restrictor plate having an orifice communicating through a conduit with the outlet of the source of pressurized fuel, disposed between said outlet of the source of pressurized fuel and the inlet of the nozzle and axially spaced upstream from the inlet of the nozzle;
   a first venturi having an inlet in communication with one portion of the fuel tank and with the outlet of the nozzle to receive fuel discharged from the nozzle, and an outlet through which fuel is discharged from the first venturi, the flow of fuel from the nozzle to the first venturi causing fuel to move from said one portion of the fuel tank into the inlet of the first venturi; and
   a second venturi having an inlet in communication with said one portion of the fuel tank and with the outlet of the first venturi to receive fuel discharged from the first venturi, and an outlet in communication with another portion of one of the fuel tank and a reservoir to move fuel from said second venturi to said one of another portion of the fuel tank and the reservoir, the flow of fuel between the first venturi and second venturi causing fuel to move from said one portion of the fuel tank into the inlet of the second venturi.

24. The fuel transfer arrangement of claim 23 wherein the fuel discharged from the outlet of the nozzle flows at a first flow rate and the fuel discharged from the outlet of the first venturi flows at a second flow rate, the second flow rate being greater than the first flow rate and the fuel discharged from the outlet of the second venturi flows at a third flow rate, the third flow rate being greater than the second flow rate.

25. The fuel transfer arrangement of claim 23 wherein the outlet of the nozzle and the inlet of the first venturi are axially spaced from one another and the outlet of the first venturi and the inlet of the second venturi are axially spaced from one another.

26. The fuel transfer arrangement of claim 23 wherein the first venturi and the second venturi are formed as a single piece of material.

27. The fuel transfer arrangement of claim 26 wherein the first venturi and the second venturi are injection molded.

28. A fuel transfer arrangement for transferring fuel from one portion of a fuel tank to another portion of a fuel tank spaced from said one portion, comprising:
   a source having an outlet of pressurized fuel;
   a jet pump with a nozzle disposed in one portion of the fuel tank, having an inlet in communication with the outlet of the source of pressurized fuel to receive pressurized fuel, and an outlet through which fuel is discharged;
   a pair of restrictor plates each having an orifice, communicating through a conduit with the outlet of the source of pressurized fuel, disposed between said outlet of the source of pressurized fuel and the inlet of the nozzle axially spaced upstream from the inlet of the nozzle and restricting the flow of pressurized fuel between the source and the nozzle; and
   a first venturi having an inlet in communication with one portion of the fuel tank and with the outlet of the nozzle to receive fuel discharged from the nozzle, and an outlet through which fuel is discharged from the first venturi, the flow of fuel from the nozzle to the first venturi causing fuel to move from said one portion of the fuel tank into the inlet of the first venturi; and the pressurized fuel between said source and one of the restrictor plates has a first pressure and the pressurized fuel between the restrictor plates has a second pressure and the pressurized fuel between another of the restrictor plates and the nozzle has a third pressure, the first pressure being greater than the second pressure and the second pressure being greater than the third pressure.

29. A fuel transfer arrangement for transferring fuel from one portion of a fuel tank to another portion of a fuel tank spaced from said one portion, comprising:
   a source having an outlet of high pressure fuel supplied to an engine;
   a jet pump having a fuel inlet, a fuel outlet downstream of the fuel inlet, and a jet nozzle disposed in one portion of the fuel tank, the jet nozzle having an inlet connected with the outlet of high pressure fuel of the source upstream of the engine to receive pressurized fuel from the source upstream of the engine, and an outlet through which fuel is discharged to entrain fuel from the fuel inlet of the jet pump and discharge the entrained fuel through the outlet of the jet pump; and
   at least one restrictor plate having an orifice connected with the outlet of the source of pressurized fuel upstream of the engine, disposed between said outlet of the source of pressurized fuel upstream of the engine and the inlet of the nozzle, axially spaced upstream from the inlet of the nozzle, restricting the flow of high pressure fuel to the nozzle and the pressure of the pressurized fuel upstream of the restrictor plate being greater than the pressure of the fuel between the restrictor plate and the inlet of the nozzle.

30. The fuel transfer arrangement of claim 29 wherein the jet nozzle has a passage with a diameter, the passage defining the inlet and the outlet of the jet nozzle, and the orifice has a diameter, the diameter of the passage in the jet nozzle being equal to or less than the diameter of the orifice.

31. The fuel transfer arrangement of claim 29 which also comprises
   a pair of orifices which communicate with the source of high pressure fuel between said source upstream of the engine and the jet nozzle of the jet pump.

32. The fuel transfer arrangement of claim 31 wherein the orifices of the pair of orifices are axially spaced from one another.

33. The fuel transfer arrangement of claim 31 wherein the jet nozzle has a passage with a diameter, the passage defining the inlet and the outlet of the jet nozzle, and the orifices have diameters, the diameter of the passage in the jet nozzle being equal to or less than the diameters of the orifices.

* * * * *

UNITED STATES PATENT AND TRADEMARK OFFICE
CERTIFICATE OF CORRECTION

PATENT NO. : 7,644,873 B2  Page 1 of 1
APPLICATION NO. : 10/779394
DATED : January 12, 2010
INVENTOR(S) : Doble et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 172 days.

Signed and Sealed this

Twenty-first Day of December, 2010

David J. Kappos
*Director of the United States Patent and Trademark Office*